United States Patent
Babu et al.

(10) Patent No.: US 11,431,564 B1
(45) Date of Patent: Aug. 30, 2022

(54) HCI DISTRIBUTED LEDGER MANAGEMENT SYSTEM

(71) Applicant: Dell Products L.P., Round Rock, TX (US)

(72) Inventors: Raghavendra Babu, Bangalore (IN); Sunil Vijendra, Bangalore (IN); Naman Goel, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/458,361

(22) Filed: Aug. 26, 2021

(51) Int. Cl.
*G06F 15/173* (2006.01)
*H04L 41/0813* (2022.01)
*H04L 9/32* (2006.01)
*H04L 43/04* (2022.01)
*H04L 41/5009* (2022.01)
*H04L 9/00* (2022.01)

(52) U.S. Cl.
CPC ........ *H04L 41/0813* (2013.01); *H04L 9/3236* (2013.01); *H04L 41/5009* (2013.01); *H04L 43/04* (2013.01); *H04L 9/50* (2022.05)

(58) Field of Classification Search
CPC ............... H04L 41/0813; H04L 9/3236; H04L 41/5009; H04L 43/04; H04L 9/50
See application file for complete search history.

(56) References Cited

U.S. PATENT DOCUMENTS 1,210,150 A * 12/1916 Clark ........................ F02N 5/02
188/78

* cited by examiner

*Primary Examiner* — Thanh T Nguyen
(74) *Attorney, Agent, or Firm* — Joseph Mencher

(57) ABSTRACT

An HCI distributed ledger management system includes a first HCI node in an HCI system that uses its first HCI node data to generate a first hash value that it stores in a distributed ledger and broadcasts to other HCI nodes in the HCI system. In response to a first modification performed on the first HCI node, the first HCI node uses its second HCI node data to generate a second hash value that it stores along with the first hash value in the distributed ledger, and broadcasts to the other HCI nodes in the HCI system. A management system may then determine that an issue exists in the HCI system and, in response, identify a cause of the issue based on the first hash value and the second hash value stored in the distributed ledger.

20 Claims, 10 Drawing Sheets

| NODE IDENTIFIER | HASH VALUE | SUB HASH VALUES | | |
|---|---|---|---|---|
| NODE 210a | HASH VALUE 506 | SUB HASH VALUE 506a | | |
| | | SUB HASH VALUE 506b | | |
| | | SUB HASH VALUE 506c | | |
| | | | | |
| | | | | |
| | | | | |
| | | | | |
| | | | | |
| | | | | |

HCI SYSTEM MANAGEMENT DATABASE 306

FIG. 5B

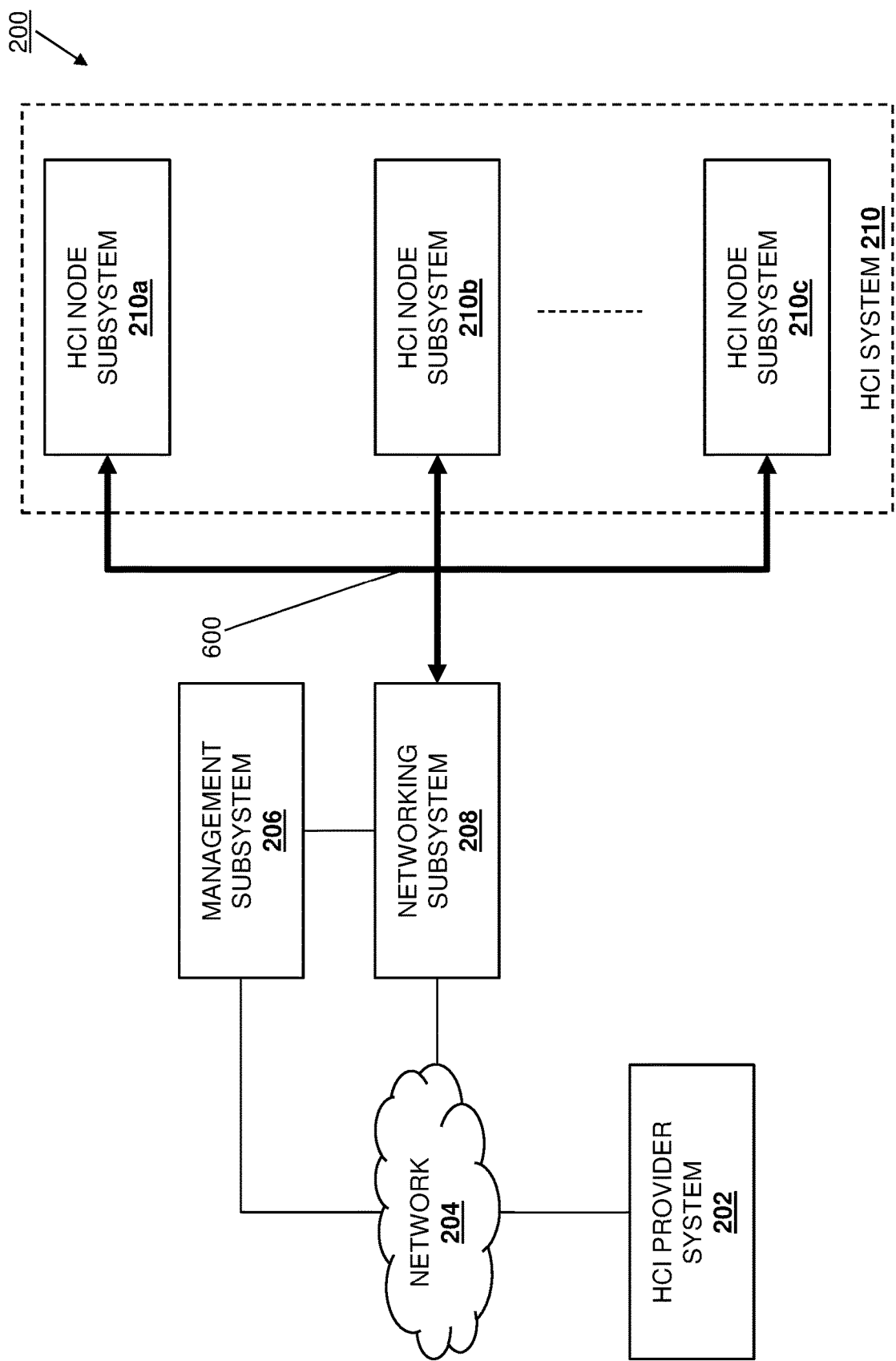

| NODE IDENTIFIER | HASH VALUE | SUB HASH VALUES |
| --- | --- | --- |
| NODE 210a | HASH VALUE 506 | SUB HASH VALUE 506a |
| | | SUB HASH VALUE 506b |
| | | SUB HASH VALUE 506c |
| NODE 210b | HASH VALUE 700 | SUB HASH VALUE 700a |
| | | SUB HASH VALUE 700b |
| | | SUB HASH VALUE 700c |
| NODE 210c | HASH VALUE 702 | SUB HASH VALUE 702a |
| | | SUB HASH VALUE 702b |
| | | SUB HASH VALUE 702c |

HCI SYSTEM MANAGEMENT DATABASE 306

FIG. 7

| NODE IDENTIFIER | HASH VALUE | SUB HASH VALUES |
|---|---|---|
| NODE 210a | HASH VALUE 800 | SUB HASH VALUE 506a |
| | | SUB HASH VALUE 802 |
| | | SUB HASH VALUE 506c |
| NODE 210b | HASH VALUE 700 | SUB HASH VALUE 700a |
| | | SUB HASH VALUE 700b |
| | | SUB HASH VALUE 700c |
| NODE 210c | HASH VALUE 702 | SUB HASH VALUE 702a |
| | | SUB HASH VALUE 702b |
| | | SUB HASH VALUE 702c |

HCI SYSTEM MANAGEMENT DATABASE 306

FIG. 8

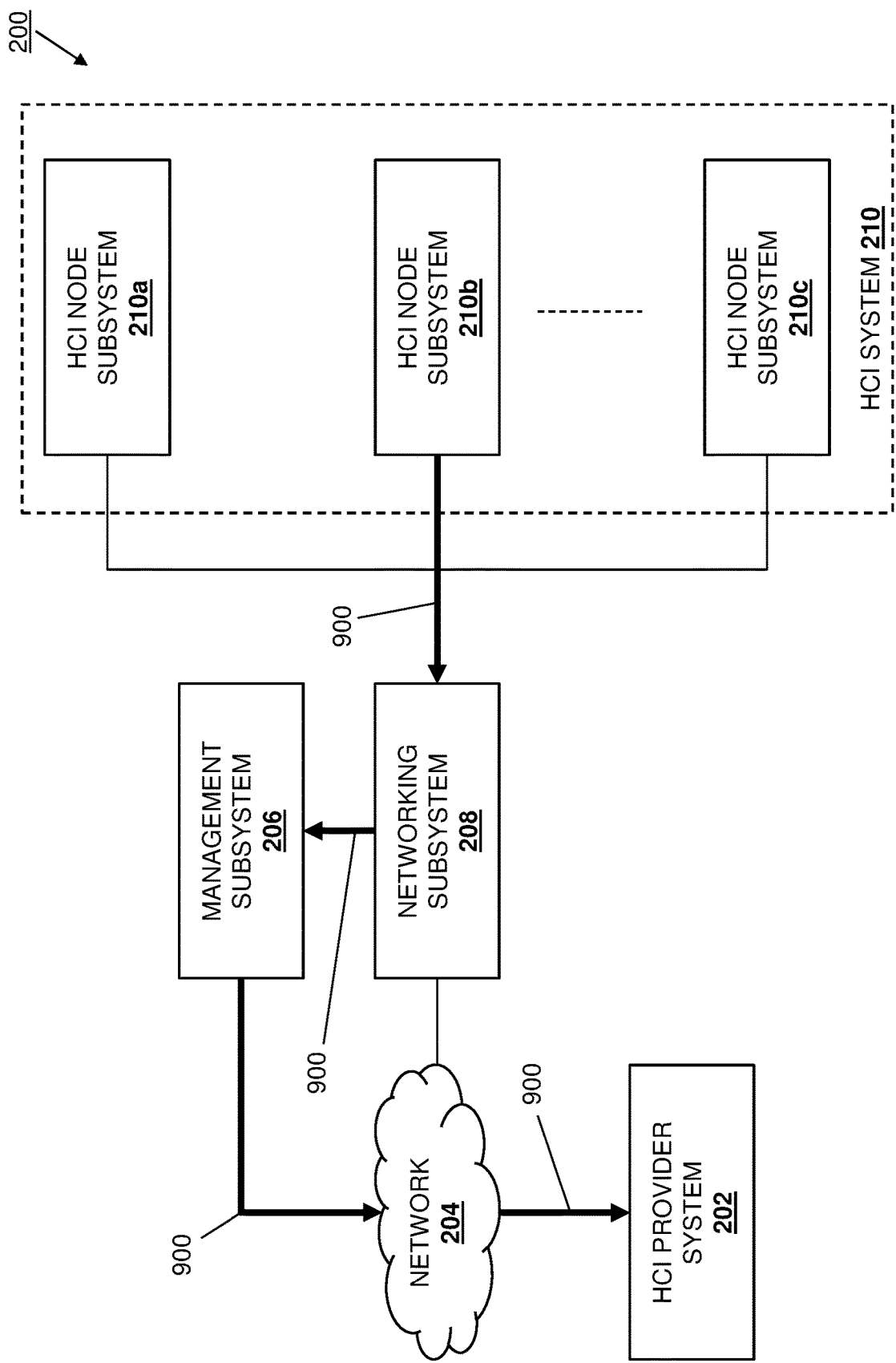

HCI DISTRIBUTED LEDGER MANAGEMENT SYSTEM

BACKGROUND

The present disclosure relates generally to information handling systems, and more particularly to the management of Hyper Converged Infrastructure (HCI) information handling systems via a distributed ledger.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, are sometimes utilized to provide Hyper-Converged Infrastructure (HCI) systems that are configured to perform compute, storage, and networking operations as part of a "cloud" infrastructure. In such HCI systems, each server device may provide an HCI node subsystem in that HCI system, and in order for the HCI system to operate in manner that provides predictable outcomes satisfying Service Level Agreements (SLAs) for customers, particular internal components and configurations (e.g., particular models of storage devices (Solid-State Drive (SSD)/Hard Disk Drive (HDD)/flash drive), memory devices (Dual Inline Memory Modules (DIMMs)), Host Bus Adapter (HBA) devices, networking devices, etc.) particular firmware versions, particular operating systems and operating system components (e.g., operating system patches), particular software versions, etc., are required in each HCI node subsystem. As such, HCI system providers typically require that an HCI system utilize identical server devices/HCI node subsystems, and managing the HCI system to ensure compliance with that requirement is particularly critical in situations in which the HCI system provider does not have "direct" control of the HCI system or access to the location where the HCI system resides.

For example, HCI node subsystems may have physical components replaced, which can cause issues with enterprise workflows that have been validated for a particular set of hardware, and while conventional HCI node subsystems may allow for the tracking of their components via Field Replaceable Unit (FRU) requests to the HCI system provider, any component replaced outside of that process will not be identifiable in the event it causes issues with HCI system operation. In another example, HCI node subsystems may have versions of at least some of its software stack changed, and the relatively large number of software components utilized in an HCI node subsystem make any particular software version change extremely difficult to track. In yet another example, many HCI node subsystems include warranties that require any changes to the HCI node subsystem be performed (or authorized) by the HCI system provider, but in practice the tracking of unauthorized changes to HCI node subsystems is very difficult to identify. In yet another example, regular HCI node subsystem updates make it difficult to track the source of errors in any particular component in the HCI node subsystem.

In yet another example, the addition of a new HCI node subsystem to an existing HCI system is relatively difficult, and requires a hardware configuration check (to ensure the hardware configuration of the new HCI node subsystem matches those of the existing HCI subsystems), an update compliance check (to ensure the new HCI node subsystem has been updated with firmware, drivers, operating system updates, etc., that match the existing HCI subsystems), license checks (to ensure the new HCI node subsystem has been licensed to use hardware and software like the existing HCI subsystems), networking configuration checks (to ensure the new HCI node subsystem has the same networking access as the existing HCI subsystems), as well as other HCI node subsystem addition operations known in the art that make the addition of new HCI node subsystems to an HCI system a time consuming, manual process. Thus, HCI system providers deal with many challenges is the provisioning of HCI systems to customers, as well as ensuring that the HCI system maintains hardware and software compliance in order to operate properly.

Accordingly, it would be desirable to provide an HCI management system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide an HCI system management engine that is configured to: generate, using first IHS data for the IHS that is included in an HCI system, a first IHS hash value; store the first IHS hash value in a distributed ledger maintained by the HCI system management engine; and broadcast the first IHS hash value to at least one HCI node subsystem that is included in the HCI system, and wherein the HCI system management engine is configured, in response to a first modification performed on the IHS, to: generate, using second IHS data for the IHS, a second IHS hash value; store the second IHS hash value along with the first IHS hash value in the distributed ledger maintained by the HCI system management engine, wherein the first IHS hash value and the second IHS hash value stored in the distributed ledger are configured to identify a cause of an issue with the HCI system; and broadcast the second IHS hash value to the at least one other HCI node subsystem that is included in the HCI system.

BRIEF DESCRIPTION OF THE DRAWINGS

FIG. 5B is a schematic view illustrating an embodiment of an HCI system management database in the HCI node subsystem of FIG. 3 during the method of FIG. 4.

FIG. 6 is a schematic view illustrating an embodiment of the networked system of FIG. 2 operating during the method of FIG. 4.

FIG. 7 is a schematic view illustrating an embodiment of an HCI system management database in the HCI node subsystem of FIG. 3 during the method of FIG. 4.

FIG. 8 is a schematic view illustrating an embodiment of an HCI system management database in the HCI node subsystem of FIG. 3 during the method of FIG. 4.

FIG. 9 is a schematic view illustrating an embodiment of the networked system of FIG. 2 operating during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
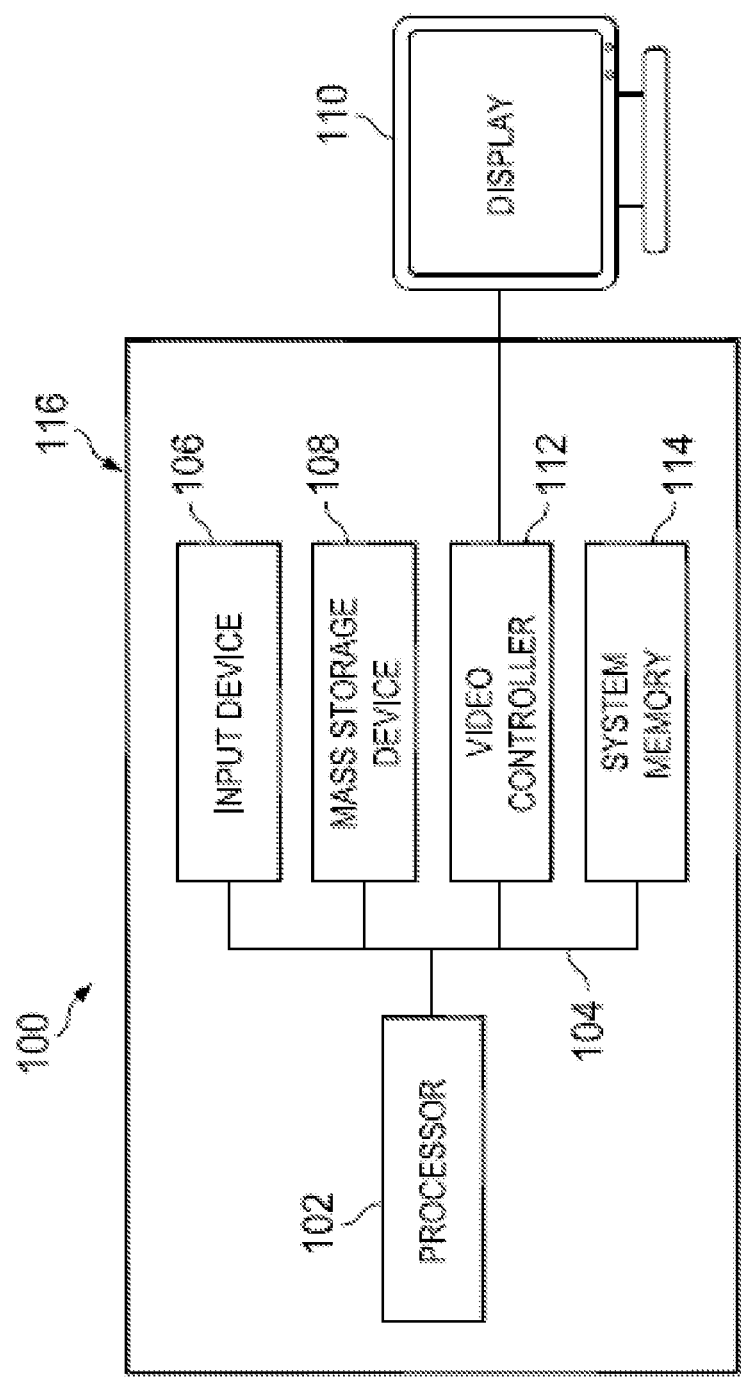
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
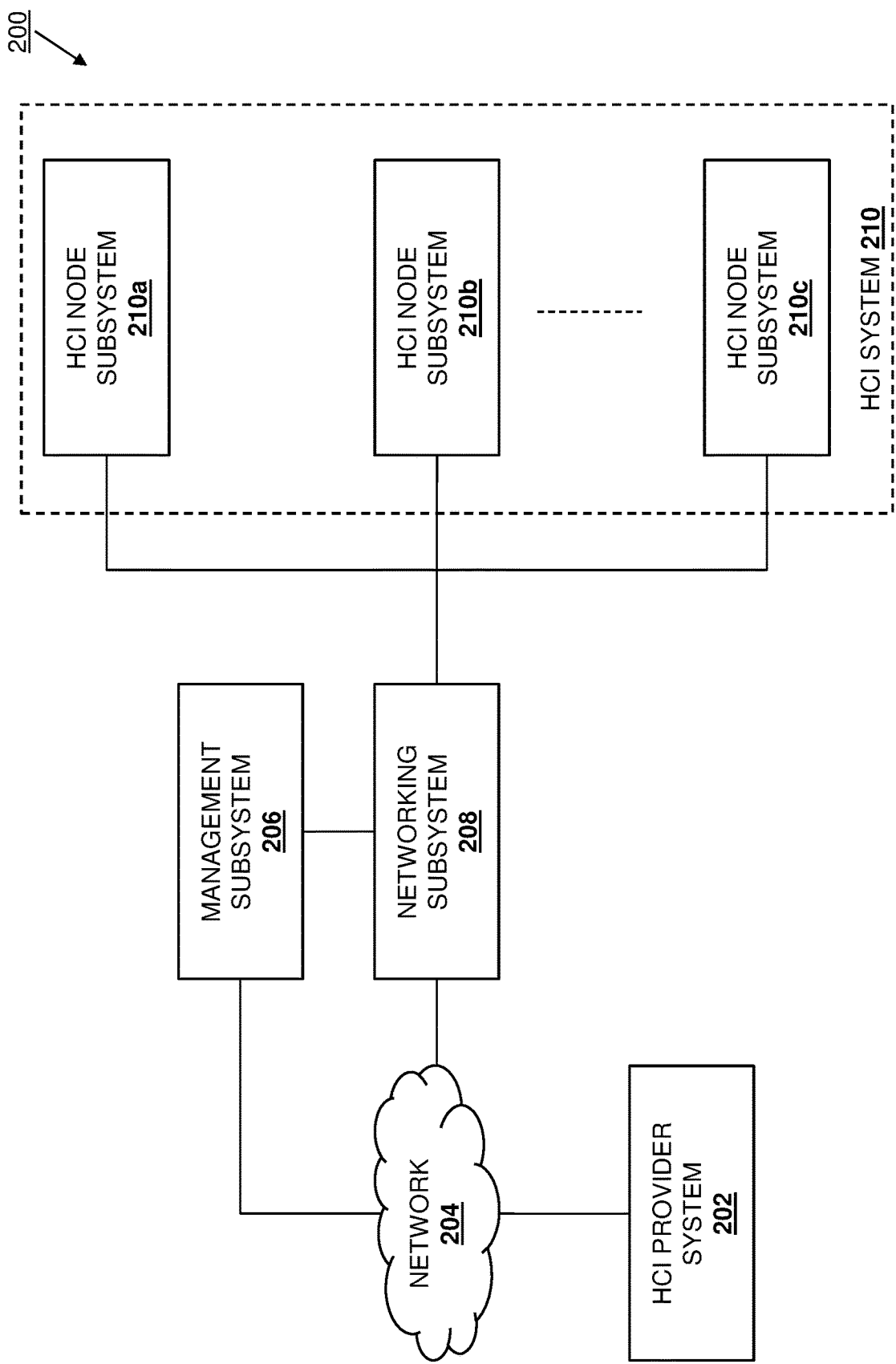
FIG. 2 is a schematic view illustrating an embodiment of a networked system that may utilize the HCI distributed ledger management system of the present disclosure.

Referring now to FIG. 2, an embodiment of a networked system 200 is illustrated that may utilize the HCI distributed ledger management system of the present disclosure. In the illustrated embodiment, the networked system 200 includes an HCI provider system 202 that one of skill in the art in possession of the present disclosure will recognize may be controlled by an HCI provider that provides HCI systems to customers and other HCI system users. In an embodiment, the HCI provider system 202 may be provided by the IHS 100 discussed above with reference to FIG. 1, and/or may include some or all of the components of the IHS 100, and in specific examples may include one or more server devices that perform the HCI provider license and warranty functionality discussed below (e.g., by providing a license and warranty repository with an Application Programming Interface (API) that allows for the licensee validation discussed below), but that one of skill in the art in possession of the present disclosure will appreciate may perform any of a variety of other HCI provider operations known in the art. However, while illustrated and discussed as a being provided by server device(s), one of skill in the art in possession of the present disclosure will recognize that HCI provider systems provided in the networked system 200 may include any devices that may be configured to operate similarly as the HCI provider system 202 discussed below.

In the illustrated embodiment, the HCI provider system 202 is coupled to the other components in the networked system 200 via a network 204 that may be provided by a Local Area Network (LAN), the Internet, combination thereof, and/or any of a variety of other networks that would be apparent to one of skill in the art in possession of the present disclosure. As illustrated, a management subsystem 206 may be coupled to the network 204. In an embodiment, the management subsystem 206 may be provided by the IHS 100 discussed above with reference to FIG. 1, and/or may include some or all of the components of the IHS 100, and in specific examples may include one or more server devices that perform the management functionality discussed below. For example, the management subsystem 206 may be provided by a management node/portal that operates to store consolidated HCI node subsystem management information that it may retrieve from the HCI provider system 202 and expose (e.g., via an API) to the networked system 200. However, while illustrated and discussed as a being provided by server device(s), one of skill in the art in possession of the present disclosure will recognize that management subsystems provided in the networked system 200 may include any devices that may be configured to operate similarly as the management subsystem 206 discussed below.

As illustrated, a networking subsystem 208 may be coupled to the network 204 and the management subsystem 206. In an embodiment, the networking subsystem 208 may be provided by the IHS 100 discussed above with reference to FIG. 1, and/or may include some or all of the components of the IHS 100, and in specific examples may include one or more switch devices that perform the networking functionality discussed below by providing a management network for the management subsystem 206 along with a data network for a Hyper-Converged Infrastructure (HCI) system 210 that is coupled to the networking subsystem 208. However, while illustrated and discussed as a being provided by switch device(s), one of skill in the art in possession of the present disclosure will recognize that networking subsystems provided in the networked system 200 may include any networking devices that may be configured to operate similarly as the networking subsystem 208 discussed below.

As discussed above, an HCI system 210 is coupled to the networking subsystem 208, and in the illustrated embodiment includes a plurality of HCI node subsystems 210a, 210b, and up to 210c. In an embodiment, any or all of the HCI node subsystems 210a-210c may be provided by the IHS 100 discussed above with reference to FIG. 1, and/or may include some or all of the components of the IHS 100, and in specific examples may each be provided by a respective server device that is configured to perform HCI compute, storage, and networking functionality along with the HCI distributed ledger management functionality discussed below. However, while illustrated and discussed as a being provided by server device(s), one of skill in the art in possession of the present disclosure will recognize that the HCI node subsystems 210a-210c provided in the networked system 200 may include any devices (storage systems, networking devices such as switch devices, etc.) that may be configured to operate similarly as the HCI node subsystems 210a-210c discussed below. As such, while a specific networked system 200 has been illustrated and described, one of skill in the art in possession of the present disclosure will recognize that the HCI distributed ledger management system of the present disclosure may include a variety of components and component configurations while remaining within the scope of the present disclosure as well.

Figure 3:
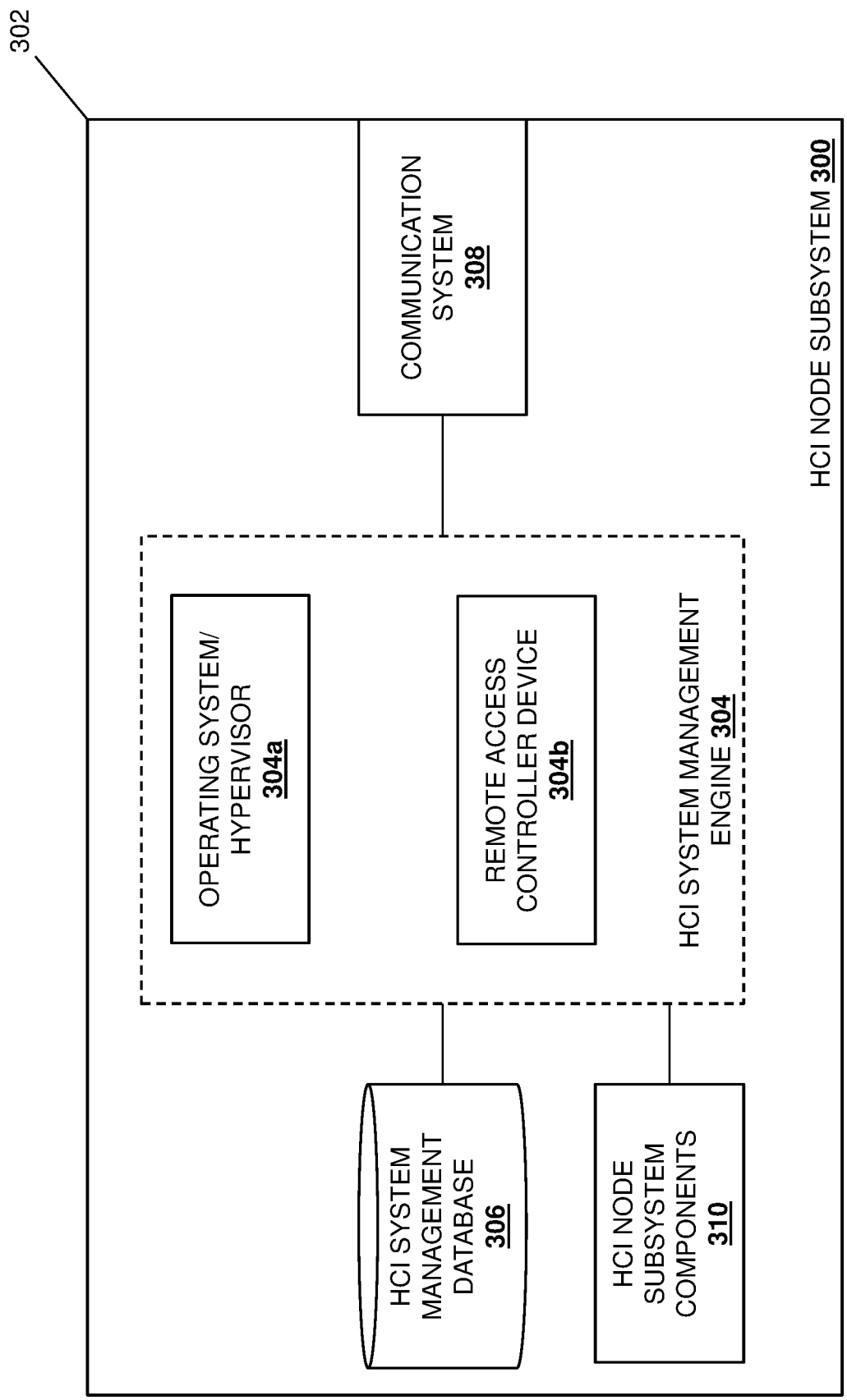
FIG. 3 is a schematic view illustrating an embodiment of an HCI node subsystem that may be included in the networked system of FIG. 2.

Referring now to FIG. 3, an embodiment of an HCI node subsystem 300 is illustrated that may provide any or all of the HCI node subsystems 210a-210c discussed above with reference to FIG. 2. As such, the HCI node subsystem 300 may be provided by the IHS 100 discussed above with reference to FIG. 1 and/or may include some or all of the components of the IHS 100, and in specific examples may be provided by a server device that is configured to perform HCI compute, storage, and networking functionality along with the HCI distributed ledger management functionality discussed below. Furthermore, while illustrated and discussed as being provided by a server device, one of skill in the art in possession of the present disclosure will recognize that the functionality of the HCI node subsystem 300 discussed below may be provided by other devices (storage systems, networking devices such as switch devices, etc.) that are configured to operate similarly as the HCI node subsystem 300 discussed below. In the illustrated embodiment, the HCI node subsystem 300 includes a chassis 302 that houses the components of the HCI node subsystem 300, only some of which are illustrated and discussed below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an HCI system management engine 304 that is configured to perform the functionality of the HCI system management engines and/or HCI node subsystems discussed below.

In the specific example illustrated and discussed herein, the HCI system management engine is provided by an operating system/hypervisor 304a and a remote access controller device 304b such as, for example, the integrated DELL® Remote Access Controller (iDRAC) included in server devices available from DELL® Inc. of Round Rock, Tex., United States, a Baseboard Management Controller (BMC), and/or other remote access controller devices known in the art. As will be appreciated by one of skill in the art in possession of the present disclosure, the operating system/hypervisor 304a may be provided by a central processing subsystem (not illustrated, but which may include the processor 102 discussed above with reference to FIG. 1 such as a Central Processing Unit (CPU)) and a main memory subsystem (not illustrated, but which may include the memory 114 discussed above with reference to FIG. 1) that is coupled to the central processing subsystem and that includes instructions that, when executed by the central processing subsystem, cause the central processing subsystem to provide at least a portion of the HCI system management engine 304. Similarly, the remote access controller device 304b may include a remote access controller processing subsystem (not illustrated, but which may include the processor 102 discussed above with reference to FIG. 1) and a remote access controller memory subsystem (not illustrated, but which may include the memory 114 discussed above with reference to FIG. 1) that is coupled to the remote access controller processing subsystem and that includes instructions that, when executed by the remote access controller processing subsystem, cause the remote access controller processing subsystem to provide at least a portion of the HCI system management engine 304.

Continuing with the specific example provided herein, the remote access controller device 304b provides a management controller/management module for the HCI system management engine 304, and may be provided by the iDRAC/BMC in server devices as discussed above, but may also be provided by management modules in storage systems, or network operating systems in switch devices in other embodiments that utilize those components in the HCI system 210 of FIG. 2. As will be appreciated by one of skill in the art in possession of the present disclosure, the remote access controller device 304b may be connected via the management network discussed above to the management subsystem 206, and may include a sideband communication interface with the operating system/hypervisor 304a. As discussed below, the remote access controller device 304b may be source of at least some of the HCI node subsystem data (e.g., system information, hardware component information, software component information, etc.) that is used to generate the HCI node subsystem hash value for the HCI node subsystem 300 at any given time, and the operating system/hypervisor 304a may be the source of at least some of the HCI node subsystem data (e.g., log information, performance information, warranty information, etc.) that is used to generate the HCI node subsystem hash value for the HCI node subsystem 300 as well (with the HCI node subsystem data retrieved from the operating system/hypervisor 304a by the remote access controller device 304b via the sideband interface discussed above, via a repository in the HCI node subsystem components discussed below, etc.) As such, the operating system/hypervisor 304a may include a management agent that is configured to collect at least some of the HCI node subsystem data and utilize that sideband interface to communicate it to the remote access controller device 304*a* or the repository in the HCI node subsystem components.

The chassis 302 may also house a storage system (not illustrated, but which may include the storage 108 discussed above with reference to FIG. 1) that is coupled to the HCI system management engine 304 (e.g., via a coupling between the storage system and the processing system) and that includes an HCI system management database 306 that is configured to store any of the information utilized by the HCI system management engine 304 discussed below. In particular, the HCI system management database 306 may be configured to store the HCI node subsystem distributed ledger discussed below, as well as the HCI node subsystem data for the HCI node subsystem 300 in which it is located, and one of skill in the art in possession of the present disclosure will appreciate how the HCI node subsystem 300 may reserve some storage space for storing the HCI node subsystem distributed ledger discussed above. Furthermore, while the HCI system management database 306 is illustrated as being included in the HCI node subsystem 300 (which is a server device in this embodiment), in embodiments in which the HCI node subsystem 300 is a switch device, the HCI system management database 306 may be provided in a connected server device or storage system that is synchronized with the switch device (e.g., using Link Layer Discovery Protocol (LLDP) techniques known in the art).

The chassis 302 may also house a communication system 308 that is coupled to the HCI system management engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. The chassis may also house a plurality of HCI node subsystem components 310 that are coupled to the HCI system management engine 304 (e.g., via a coupling between the HCI node subsystem components 310 and the processing system) and that may be provided by hardware components (e.g., processing subsystems, memory subsystems, networking subsystems, storage subsystems, peripheral subsystems, etc.), software components, firmware, system database information, log database information, inventory database information, license database information, warranty database information, performance database information, and/or any other HCI subsystem components that would be apparent to one of skill of the art. However, while a specific HCI node subsystem 300 has been illustrated and described, one of skill in the art in possession of the present disclosure will recognize that HCI node subsystem 300 (or other devices operating according to the teachings of the present disclosure in a manner similar to that described below for the HCI node subsystem 300) may include a variety of components and/or component configurations for providing conventional HCI node subsystem functionality, as well as the functionality discussed below, while remaining within the scope of the present disclosure as well.

Figure 4:
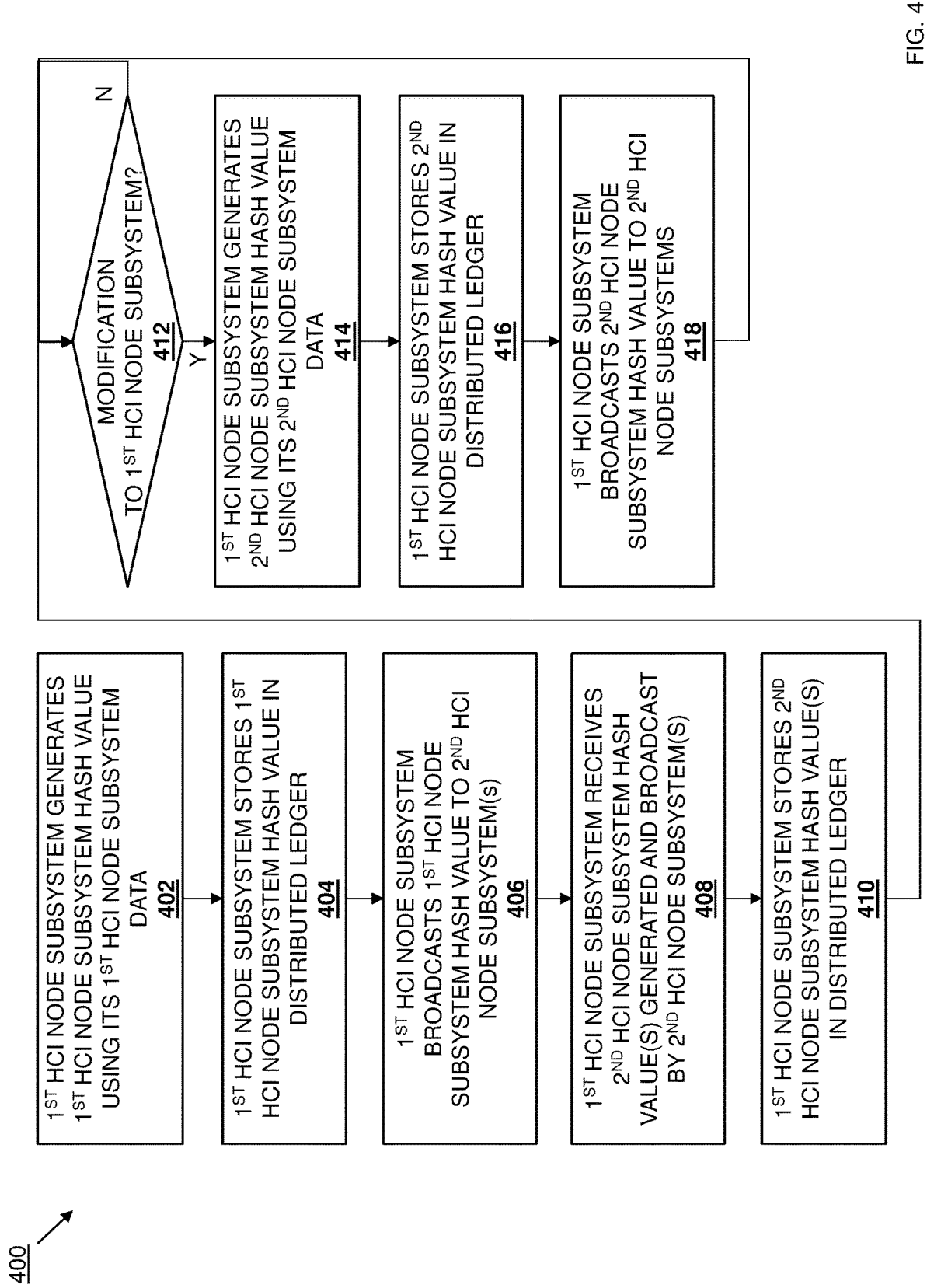
FIG. 4 is a flow chart illustrating an embodiment of a method for managing an HCI system via a distributed ledger.

Referring now to FIG. 4, an embodiment of a method 400 for managing a Hyper-Converged Infrastructure (HCI) system via a distributed ledger is illustrated. As discussed below, the systems and methods of the present disclosure provide for federated control of HCI infrastructure via the use of a distributed ledger maintained by each of the HCI node subsystems in an HCI system. For example, the HCI distributed ledger management system of the present disclosure may include a first HCI node in an HCI system that uses its first HCI node data to generate a first hash value that it stores in a distributed ledger and broadcasts to other HCI nodes in the HCI system. In response to a first modification performed on the first HCI node, the first HCI node uses its second HCI node data to generate a second hash value that it stores along with the first hash value in the distributed ledger, and broadcasts to the other HCI nodes in the HCI system. A management system may then determine that an issue exists in the HCI system and, in response, identify a cause of the issue based on the first hash value and the second hash value stored in the distributed ledger. The second hash value in the distributed ledger may also be used by the first HCI node to approve the configuration changes in other HCI nodes in the HCI system, approve the addition of other HCI nodes to the HCI system, and perform other HCI system management operations known in the art. As such, management of HCI systems is facilitated even in situations in which the HCI system provider does not have "direct" control of the HCI system or access to the location where the HCI system resides.

In an embodiment, prior to or during the method 400, the HCI system 210 discussed above may be provided to a customer by an HCI system provider. As part of the HCI system provisioning/manufacturing process, the HCI system provider may configure each of the HCI node subsystems 210*a*-210*c*/300 identically such that they include the same HCI node subsystem components 310 (e.g., the same hardware components (e.g., processing subsystems, memory subsystems, networking subsystems, storage subsystems, peripheral subsystems, etc.), software components, firmware, system database information, log database information, inventory database information, license database information, warranty database information, performance database information, and/or any other HCI subsystem components that would be apparent to one of skill of the art). As discussed above, in order for the HCI node subsystems 210*a*-210*c*/300 to operate in manner that provides predictable outcomes satisfying Service Level Agreements (SLAs) for customers, particular internal components and configurations are required in each of the HCI node subsystems 210*a*-210*c*/300, and thus while some differences may exist between the HCI node subsystems 210*a*-210*c*/300, any components and configurations in the HCI node subsystems 210*a*-210*c*/300 that effect the operation of the HCI node subsystems 210*a*-210*c*/300 in satisfying SLAs for customers or otherwise operating in a predictable/desired manner may be identical across each of the HCI node subsystems 210*a*-210*c*/300.

Figure 5A:
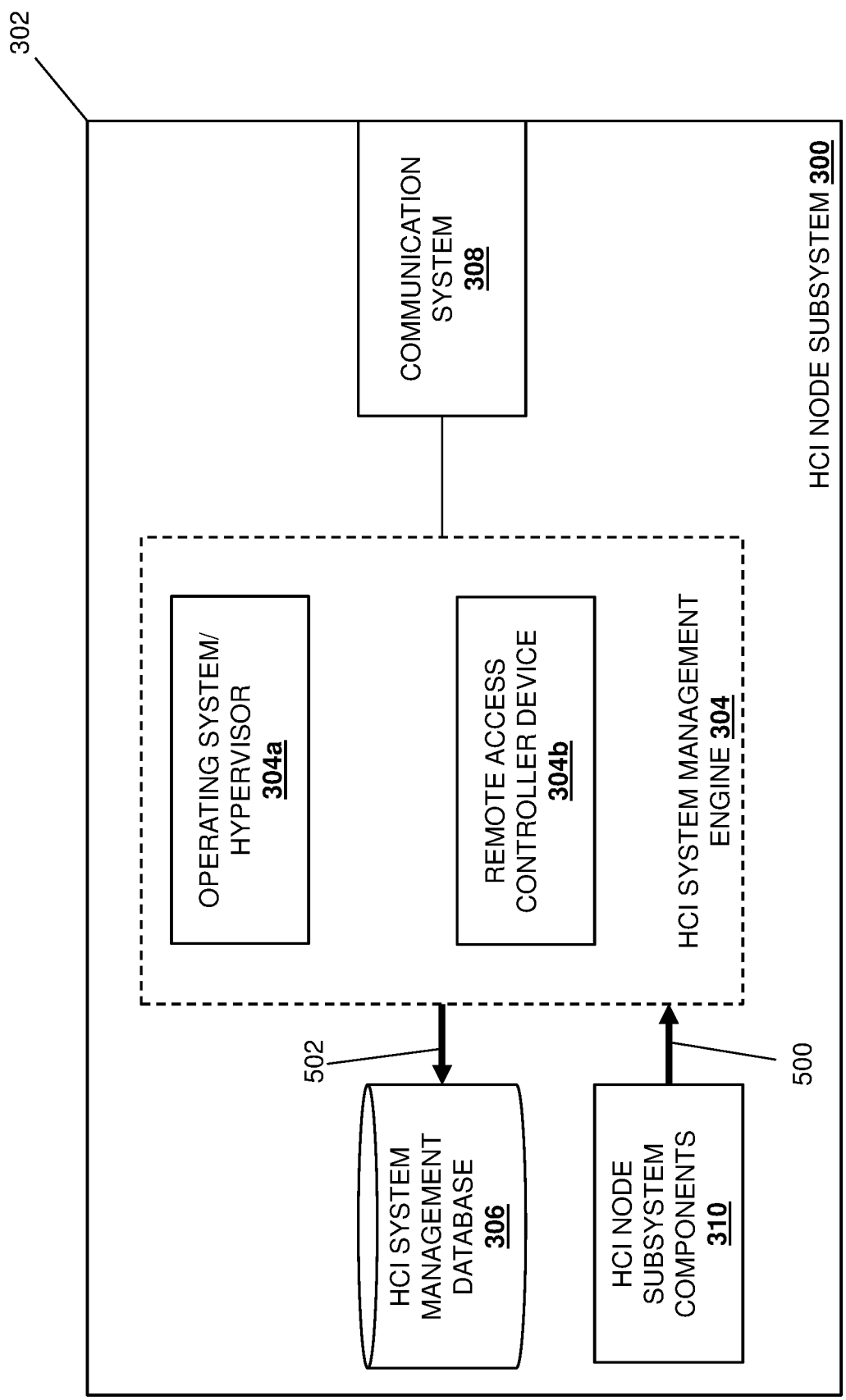
FIG. 5A is a schematic view illustrating an embodiment of the HCI node subsystem of FIG. 3 operating during the method of FIG. 4.

The method 400 begins at block 402 where a first HCI node subsystem generates a first HCI node subsystem hash value using its first HCI node subsystem data. With reference to FIG. 5, in an embodiment of block 402, the HCI system management engine 304 (e.g., the remote access controller device 304*b*) in each of the HCI node subsystems 210*a*-210*c*/300 may operate to perform HCI node subsystem data retrieval operations 500 that include retrieving HCI node subsystem data from its HCI node subsystem components 310. For example, the HCI node subsystem data may identify HCI node hardware component(s) for that HCI node subsystem, HCI node software component(s) for that HCI node subsystem, HCI node configuration(s) for that HCI node subsystem, HCI node alert(s) for that HCI node subsystem, and HCI node performance information for that HCI node subsystem. As such, the HCI node subsystem data for any HCI node subsystem may include any information about processing subsystem(s), memory subsystem(s), networking subsystem(s), storage(s), peripheral subsystem(s), software component(s), and/or firmware, as well as any information stored in a system database, a log database, an inventory database, a license database, a warranty database, and/or a performance database. As will be appreciated by one of skill in the art in possession of the present disclosure, the HCI node subsystem data may be selected to include any information associated with each of the components and configurations in the HCI node subsystems 210a-210c/300 that effect the operation of the HCI node subsystems 210a-210c/300 in satisfying SLAs for customers or otherwise operating in a predictable/desired manner.

In an embodiment of block 402, the HCI system management engine 304 (e.g., the remote access controller device 304b) in each of the HCI node subsystems 210a-210c/300 may then perform a hashing operation (e.g., a Secure Hash Algorithm 256 (SHA-256) or other hashing algorithms known in the art) on the HCI node subsystem data to generate an HCI node subsystem hash value for that HCI node subsystem. As will be appreciated by one of skill in the art in possession of the present disclosure, the performance of the hashing operation on the HCI node subsystem data will map the HCI node subsystem data to a fixed sized value provided by the HCI node subsystem hash value, and if HCI node subsystem data is identical across the different HCI node subsystems 210a-210c/300, the HCI node subsystem hash values that are generated by each of the HCI node subsystems 210a-210c/300 will be identical as well. In a specific example, the initial HCI node subsystem hash values may be generated at block 402 by each of the HCI node subsystems during the HCI system provisioning/manufacturing performed by the HCI system provider 202, which one of skill in the art in possession of the present disclosure will recognize allows a compliance check to be performed to to ensure that each of those HCI node subsystems 210a-210c/300 are identical (e.g., as the identical HCI node subsystem hash values may be interpreted as identical HCI node subsystems). However, in other examples, the initial HCI node subsystem hash values may be generated at block 402 by each of the HCI node subsystems subsequent to the provisioning of the HCI system 210 to the customer and as part of the networked system 200 while remaining within the scope of the present disclosure as well.

In some embodiments of block 402, the HCI system management engine 304 (e.g., the remote access controller device 304b) in each of the HCI node subsystems 210a-210c/300 may also perform a hashing operation (e.g., the SHA-256 or other hashing algorithms known in the art) on subsets of the HCI node subsystem data to generate respective HCI node subsystem "sub" hash values for that HCI node subsystem. For example, the hashing operation may be performed on the HCI node subsystem sub data that identifies HCI node hardware component(s) for that HCI node subsystem. In another example, the hashing operation may be performed on the HCI node subsystem sub data that identifies HCI node software component(s) for that HCI node subsystem. In another example, the hashing operation may be performed on the HCI node subsystem sub data that identifies HCI node configuration(s) for that HCI node subsystem. In another example, the hashing operation may be performed on the HCI node subsystem sub data that identifies HCI node alert(s) for that HCI node subsystem. In another example, the hashing operation may be performed on the HCI node subsystem sub data that identifies HCI node performance information for that HCI node subsystem. As discussed below, while the HCI node subsystem hash value generated from HCI node subsystem data for an HCI node subsystem may be utilized to identify a modification in that HCI node subsystem, the HCI node subsystem sub hash values generated from HCI node subsystem sub data for an HCI node subsystem may be utilized to identify a modification to particular components or configurations in that HCI node subsystem.

The method 400 then proceeds to block 404 where the first HCI node subsystem stores the first HCI node subsystem hash value in a distributed ledger. With continued reference to FIG. 5, in an embodiment of block 404, the HCI system management engine 304 (e.g., the remote access controller device 304b) in each of the HCI node subsystems 210a-210c/300 may operate to perform HCI node subsystem hash value storage operations 502 that include storing the HCI node subsystem hash value that it generated at block 402 in its HCI system management database 306. Furthermore, the HCI node subsystem hash value storage operations 502 may include each HCI node subsystem 210a-210c/300 storing the HCI node subsystem sub hash values discussed above as being generated at block 402 in some embodiments in their HCI system management database 306 as well. Similarly as discussed above, in some specific examples the initial HCI node subsystem hash values may be stored at block 404 by each of the HCI node subsystems during the HCI system provisioning/manufacturing performed by the HCI system provider 202. However, in other examples, the initial HCI node subsystem hash values may be stored at block 404 by each of the HCI node subsystems subsequent to the provisioning of the HCI system 210 to the customer and as part of the networked system 200 while remaining within the scope of the present disclosure as well. Furthermore, in some examples, the initial HCI node subsystem hash values may be encrypted (e.g., using a certificate provided by the HCI system provider) by each of the HCI node subsystems prior to storage at block 404.

In some embodiments, upon initial power-on of each of the HCI node subsystems 210a-210c/300 (e.g., once the HCI node subsystems 210a-210c/300 have been added to the networked system 200), the HCI system management engine 304 (e.g., the remote access controller device 304b) in each of the HCI node subsystems 210a-210c/300 may operate to generate an HCI node subsystem ledger in its HCI system management database 306, and populate that ledger with its HCI node subsystem hash value at block 404 (as well as populate that ledger with its HCI node subsystem sub hash value in some embodiments). For example, with reference to FIG. 5B, an embodiment of a ledger 504 is illustrated that may be generated and stored in the HCI system management database 306 of HCI node subsystem 210a/300 at block 404, and one of skill in the art in possession of the present disclosure that similar ledgers may be generated and stored by the HCI node subsystems 210b-210c as well. In the illustrated example, the ledger 504 includes a node identifier column, a hash value column, and a sub-hash value column. As illustrated in the specific example of FIG. 5B, at block 404 the HCI node subsystem 210a may populate the node identifier column in the ledger 504 with its node identifier (e.g., "NODE 210a"), may populate the hash value column in the ledger 504 with a hash value 506 that it generated at block 402 in association with its node identifier, and may populate the sub hash value column in the ledger 504 with sub hash values 506a, 506b, and up to 506c that it generated at block 402 in association with its node identifier.

In some embodiments, along with the storage of the HCI node subsystem hash values at block 404, the HCI system management engine 304 (e.g., the remote access controller device 304b) in each of the HCI node subsystems 210a-210c/300 may operate to store its HCI node subsystem data that was used to generate its HCI node subsystem hash value (and HCI node subsystem sub hash values in some embodiments) in the HCI system management database 306. As such, following power-on of the HCI node subsystems 210a-210c/300 after their provisioning in the networked system 200, each HCI node subsystem 210a-210c/300 will include a ledger having its HCI node subsystem hash value (and HCI node subsystem sub hash values in some embodiments), as well as the HCI node subsystem data it used to generate that HCI node subsystem hash value (and HCI node subsystem sub hash values in some embodiments). In some embodiments, following the on-boarding of each of the HCI node subsystems 210a-210c/300 as part of the HCI system 210, each HCI node subsystem 210a-210c/300 may reserve some space in its HCI system management database 306 for the ledger and archived ledgers or other historical ledger data (discussed in further detail below), and based on storage resource availability, that reserved space may be expanded in the event the size of the ledger and archived ledgers or historical ledger data grows. Furthermore, while one of skill in the art in possession of the present disclosure will appreciate that the size of the ledger is relatively small, the size of the ledger may be subject to a threshold that, once it grows beyond that threshold, provides for the purging of old data (e.g., to a Unified Extensible Firmware Interface (UEFI) reserved partition or virtual Flash device).

The method 400 then proceeds to block 406 where the first HCI node subsystem broadcasts the first HCI node subsystem hash value to one or more second HCI node subsystems. With reference to FIG. 6, in an embodiment of block 406, the HCI system management engine 304 (e.g., the remote access controller device 304b) in each of the HCI node subsystems 210a-210c/300 may perform HCI node subsystem hash value broadcast operations 600 that include the HCI system management engine 304 (e.g., the remote access controller device 304b) in each of the HCI node subsystems 210a-210c/300 broadcasting the HCI node subsystem hash value it generated at block 402 (as well as the HCI node subsystem sub hash values in some embodiments). As such, the HCI node subsystem hash value broadcast operations 600 may include the HCI system management engine 304 (e.g., the remote access controller device 304b) in the HCI node subsystem 210a/300 broadcasting its HCI node subsystem hash value (and HCI node subsystem sub hash values in some embodiments) to the HCI node subsystems 210b and 210c, the HCI system management engine 304 (e.g., the remote access controller device 304b) in the HCI node subsystem 210b/300 broadcasting its HCI node subsystem hash value (and HCI node subsystem sub hash values in some embodiments) to the HCI node subsystems 210a and 210c, and the HCI system management engine 304 (e.g., the remote access controller device 304b) in the HCI node subsystem 210c/300 broadcasting its HCI node subsystem hash value (and HCI node subsystem sub hash values in some embodiments) to the HCI node subsystems 210a and 210b. Similarly as discussed above, in some examples the HCI node subsystem hash values may be encrypted (e.g., using a certificate provided by the HCI system provider) by each of the HCI node subsystems prior to broadcast at block 406.

Thus, following the on-boarding of each of the HCI node subsystems 210a-210c/300 as part of the HCI system 210, each HCI node subsystem 210a-210c/300 will share its HCI node subsystem hash value (and HCI node subsystem sub hash values in some embodiments) with the other HCI node subsystems 210a-210c/300. As discussed in further detail below, the receiving of HCI node subsystem hash values (and HCI node subsystem sub hash values in some embodiments) by an HCI system management engine 304 (e.g., the remote access controller device 304b) in an HCI node subsystem will trigger an update to the ledger maintained by that HCI node subsystem and stored in its HCI system management database 306.

The method 400 then proceeds to block 408 where the first HCI node subsystem receives second HCI node subsystem hash value(s) generated and broadcast by the one or more second HCI node subsystems. With reference back to FIG. 6, in an embodiment of block 408 and as part of the HCI node subsystem hash value broadcast operations 600 performed by the HCI node subsystems 210a-210c/300, the HCI system management engine 304 (e.g., the remote access controller device 304b) in the HCI node subsystem 210a/300 will receive the HCI node subsystem hash values (and HCI node subsystem sub hash values in some embodiments) generated and broadcast by each of the HCI node subsystem 210b/300 and the HCI node subsystem 210c/300. Similarly, in an embodiment of block 408 and as part of the HCI node subsystem hash value broadcast operations 600 performed by the HCI node subsystems 210a-210c/300, the HCI system management engine 304 (e.g., the remote access controller device 304b) in the HCI node subsystem 210b/300 will receive the HCI node subsystem hash values (and HCI node subsystem sub hash values in some embodiments) generated and broadcast by each of the HCI node subsystem 210a/300 and the HCI node subsystem 210c/300, and the HCI system management engine 304 (e.g., the remote access controller device 304b) in the HCI node subsystem 210c/300 will receive the HCI node subsystem hash values (and HCI node subsystem sub hash values in some embodiments) generated and broadcast by each of the HCI node subsystem 210a/300 and the HCI node subsystem 210b/300.

The method 400 then proceeds to block 410 where the first HCI node subsystem stores the second HCI node subsystem hash value(s) in the distributed ledger. With reference to FIG. 7, in an embodiment of block 410 and with reference to the ledger 504 discussed above with reference to FIG. 5B that was generated by the HCI node subsystem 210a/300, the HCI system management engine 304 (e.g., the remote access controller device 304b) in the HCI node subsystem 210a/300 may populate the node identifier column in the ledger 504 with a node identifier for the HCI node subsystem 210b (e.g., "NODE 210b"), may populate the hash value column in the ledger 504 with a hash value 700 that it received from the HCI node subsystem 210b at block 408 in association with the node identifier for the HCI node subsystem 210b, and may populate the sub hash value column in the ledger 504 with sub hash values 700a, 700b, and up to 700c that it received from the HCI node subsystem 210b at block 408 in association with the node identifier for the HCI node subsystem 210b. Similarly, the HCI system management engine 304 (e.g., the remote access controller device 304b) in the HCI node subsystem 210a/300 may populate the node identifier column in the ledger 504 with a node identifier for the HCI node subsystem 210c (e.g., "NODE 210c"), may populate the hash value column in the ledger 504 with a hash value 702 that it received from the HCI node subsystem 210c at block 408 in association with the node identifier for the HCI node subsystem 210c, and may populate the sub hash value column in the ledger 504 with sub hash values 702a, 702b, and up to 702c that it received from the HCI node subsystem 210c at block 408 in association with the node identifier for the HCI node subsystem 210c. While not explicitly illustrated herein, one of skill in the art in possession of the present disclosure will appreciate how each of the HCI node subsystems 210b and 210c may populate their respective ledgers with the HCI node subsystem hash values (and HCI node subsystem sub hash values in some embodiments) generated and broadcast by the other HCI node subsystems in a similar manner as well.

As such, following block 410, a distributed ledger is maintained by each of the HCI node subsystems 210a-210c/300 in the HCI system 210, with the HCI system management engine 304 (e.g., the remote access controller device 304b) in each of the HCI node subsystems 210a-210c/300 operating to maintain its copy of that distributed ledger (e.g., the HCI system management engine 304 in the HCI node subsystem 210a/300 maintains the ledger 504 discussed above that is a copy of the distributed ledger) that identifies itself in association with its HCI node subsystem hash value (and HCI node subsystem sub hash values in some embodiments), and identifies the other HCI node subsystems in association with their respective HCI node subsystem hash value (and HCI node subsystem sub hash values in some embodiments). Furthermore, one of skill in the art in possession of the present disclosure will appreciate how the initial distributed ledger maintained by the HCI node subsystems 210a-210c/300 will include identical HCI node subsystem hash values (and HCI node subsystem sub hash values in some embodiments) for all of the HCI node subsystems 210a-210c/300 due to those HCI node subsystems 210a-210c/300 having been provided identically by the HCI system provider as discussed above.

The method 400 then proceeds to decision block 412 where it is determined whether a modification has been performed to the first HCI node subsystem. In an embodiment, at decision block 412, the HCI system management engine 304 (e.g., the remote access controller device 304b) in each of the HCI node subsystems 210a-210c/300 may operate to determine whether a modification has been performed to its HCI node subsystem. As will be appreciated by one of skill in the art in possession of the present disclosure, modifications to any HCI node subsystem may include modifications to processing subsystem(s), memory subsystem(s), networking subsystem(s), storage subsystem(s), peripheral subsystem(s), software component(s), and/or firmware, as well as any modifications to information stored in a system database, a log database (e.g., due to an alert or telemetry data that is logged), an inventory database (e.g., due to an inventory change), a license database, a warranty database, and/or a performance database (e.g., due to a performance change). As such, the HCI system management engine 304 (e.g., the remote access controller device 304b) in each of the HCI node subsystems 210a-210c/300 may be configured to identify those (or any other) HCI node subsystem modifications that would be apparent to one of skill in the art in possession of the present disclosure.

If, at decision block 412, it is determined that no modification has been performed to the first HCI node subsystem, the method 400 returns to decision block 412. As such, the method 400 may loop such that, as long as no modification is performed to any of the HCI subsystems 210a-210c/300 in the HCI system 210, the HCI system management engine 304 (e.g., the remote access controller device 304b) in each of the HCI node subsystems 210a-210c/300 continue to determine whether a modification has been performed to its HCI node subsystem. Thus, following the generation of the distributed ledger maintained by the HCI node subsystems 210a-210c in the HCI system 210, the distributed ledger remains static (i.e., the HCI node subsystem hash values stored in the ledger maintained by each HCI node subsystem 210a-210c/300 do not change) as along as no modifications are performed to any of the HCI node subsystems 210a-210c/300.

If at decision block 412, it is determined that a modification has been performed to the first HCI node subsystem, the method 400 proceeds to block 414 where the first HCI node subsystem generates a second HCI node subsystem hash value using its second HCI node subsystem data. In an embodiment, at block 414 and following detecting a modification to the HCI node subsystem 210a, the HCI system management engine 304 (e.g., the remote access controller device 304b) in the HCI node subsystems 210a/300 may operate to perform HCI node subsystem data retrieval operations (e.g., similar to the HCI node subsystem data retrieval operations 500 discussed above with reference to FIG. 5A) that include retrieving HCI node subsystem data from its HCI node subsystem components 310. Similarly as discussed above, the HCI node subsystem data retrieved at block 414 may identify HCI node hardware component(s) for that HCI node subsystem, HCI node software component(s) for that HCI node subsystem, HCI node configuration(s) for that HCI node subsystem, HCI node alert(s) for that HCI node subsystem, and HCI node performance information for that HCI node subsystem, and one of skill in the art in possession of the present disclosure will appreciate how at least some of the HCI node subsystem data may have changed due to the modification that was performed to the HCI node subsystem 210a.

In an embodiment of block 414 and similarly as described above, the HCI system management engine 304 (e.g., the remote access controller device 304b) in the HCI node subsystems 210a-210c/300 may then perform a hashing operation (e.g., the SHA-256 or other hashing algorithms known in the art) on the HCI node subsystem data to generate an HCI node subsystem hash value for that HCI node subsystem. As will be appreciated by one of skill in the art in possession of the present disclosure, the performance of the hashing operation on the HCI node subsystem data retrieved at block 414 will generate an HCI node subsystem hash value that is different than the HCI node subsystem hash value generated by the HCI node subsystem 210a/300 at block 402 due to the modification that was performed to the HCI node subsystem 210a changing the HCI node subsystem data.

Similarly as discussed above, in some embodiments of block 414 the HCI system management engine 304 (e.g., the remote access controller device 304b) in the HCI node subsystem 210a/300 may perform a hashing operation (e.g., the SHA-256 or other hashing algorithms known in the art) on subsets of the HCI node subsystem data retrieved at block 414 to generate HCI node subsystem "sub" hash values for the HCI node subsystem 210a/300. For example, the hashing operation may be performed on the HCI node subsystem sub data that identifies HCI node hardware component(s) for that HCI node subsystem, on the HCI node subsystem sub data that identifies HCI node software component(s) for that HCI node subsystem, on the HCI node subsystem sub data that identifies HCI node configuration(s) for that HCI node subsystem, on the HCI node subsystem sub data that identifies HCI node alert(s) for that HCI node subsystem, or on the HCI node subsystem sub data that identifies HCI node performance information for that HCI node subsystem, and due to the modification performed on the HCI node subsystem 210a at least some of the HCI node subsystem sub data may have changed, resulting in a change in the HCI node subsystem sub hash value that is generated relative to the HCI node subsystem sub hash value that was generated at block 402. As such, the HCI node subsystem sub hash values generated from HCI node subsystem data for an HCI node subsystem may change due to modification(s) performed on that HCI node subsystem, and may thus be utilized to identify a modification to particular components or configurations in that HCI node subsystem.

The method 400 then proceeds to block 416 where the first HCI node subsystem stores the second HCI node subsystem hash value in the distributed ledger. In an embodiment, at block 416, the HCI system management engine 304 (e.g., the remote access controller device 304*b*) in the HCI node subsystem 210*a*/300 may operate to perform HCI node subsystem hash value storage operations (e.g., similar to the HCI node subsystem hash value storage operations 502 discussed above with reference to FIG. 5A) that include storing the HCI node subsystem hash value that it generated at block 414 in its HCI system management database 306. Furthermore, the HCI node subsystem hash value storage operations at block 416 may include the HCI node subsystem 210*a*/300 storing the HCI node subsystem sub hash values generated at block 414 in its HCI system management database 306 as well. As illustrated in the specific example of FIG. 8, at block 404 the HCI node subsystem 210*a* may populate the hash value column in the ledger 504 with a hash value 800 that it generated at block 414 in association with its node identifier (e.g., in place of the hash value 506 that was initially populated in the hash value column in the ledger 504 in association with its node identifier), and may populate the sub hash value column in the ledger 504 with sub hash value 802 that it generated at block 414 in association with its node identifier (e.g., in place of the sub hash value 506*b* that was initially populated in the sub hash value column in the ledger 504 in association with its node identifier). Furthermore, one of skill in the art in possession of the present disclosure will appreciate how different versions (e.g., ledger "archives") of the ledger 504 (e.g., the versions illustrated in FIGS. 7 and 8) or ledger data may be stored in the HCI system management database 306 in order to allow for the HCI node subsystem hash value changes discussed below to be identified.

The method 400 then proceeds to block 418 where the first HCI node subsystem broadcasts the second HCI node subsystem hash value to the one or more second HCI node subsystems. In an embodiment, at block 418, the HCI system management engine 304 (e.g., the remote access controller device 304*b*) in the HCI node subsystem 210*a*/300 may perform HCI node subsystem hash value broadcast operations (e.g., similar to the HCI node subsystem hash value broadcast operations 600 discussed above with reference to FIG. 6) that include the HCI system management engine 304 (e.g., the remote access controller device 304*b*) in the HCI node subsystem 210*a*/300 broadcasting the HCI node subsystem hash value it generated at block 414 (as well as the HCI node subsystem sub hash values in some embodiments). As such, the HCI node subsystem hash value broadcast operations at block 418 may include the HCI system management engine 304 (e.g., the remote access controller device 304*b*) in the HCI node subsystem 210*a*/300 broadcasting its HCI node subsystem hash value (and HCI node subsystem sub hash values in some embodiments) generated at block 414 (and in response to the modification of the HCI node subsystem 210*a*) to the HCI node subsystems 210*b* and 210*c*. Furthermore, in some examples, the HCI node subsystem hash value may be encrypted (e.g., using a certificate provided by the HCI system provider) by the HCI node subsystes prior to broadcast at block 418. As will be appreciated by one of skill in the art in possession of the present disclosure, in response to receiving the broadcast of the HCI node subsystem hash value (and HCI node subsystem sub hash values in some embodiments) from the HCI node subsystem 210*a*/300 at block 418, each of the HCI node subsystems 210*b*-210*c*/300 may operate to update its ledger similarly as described above with reference to 410, but with only the HCI node subsystem hash value (and HCI node subsystem sub hash values in some embodiments) that have changed and are associated with the HCI node subsystem 210*a*/300.

Thus, following the modification of the HCI node subsystems 210*a*-210*c*/300, the HCI node subsystem 210*a*/300 will share its updated HCI node subsystem hash value (and updated HCI node subsystem sub hash values in some embodiments) with the other HCI node subsystems 210*b*-210*c*/300. As discussed above, the receiving of updated HCI node subsystem hash values (and updated HCI node subsystem sub hash values in some embodiments) by an HCI system management engine 304 (e.g., the remote access controller device 304*b*) in an HCI node subsystem 210*b*-210*c*/300 will trigger an update to the ledger maintained by that HCI node subsystem and stored in its HCI system management database 306, and thus the distributed ledger maintained by each of the HCI node subsystems 210*a*-210*c*/300 in the HCI system 210 will remain the same across those HCI node subsystems 210*a*-210*c*/300.

The method 400 then returns to decision block 412. As such, the method 400 may loop such that that distributed ledger continues to be updated any time a modification is performed on an HCI node subsystem 210*a*-210*c*/300 in the HCI system 210. For example, if a hardware component is changed in an HCI node subsystem, a new HCI node subsystem hash value and a new HCI node subsystem sub-hash value (corresponding to the hardware components in that HCI node subsystem) may be populated in the distributed ledgers maintained by the HCI node subsystem 210*a*-210*c*/300 in the HCI system 210. As such, changes in processing subsystem(s), memory subsystem(s), networking subsystem(s), and/or storage subsystem(s) in an HCI node subsystem will be documented in the distributed ledger.

In another example, if a software component is changed in an HCI node subsystem, a new HCI node subsystem hash value and a new HCI node subsystem sub-hash value (corresponding to the software components in that HCI node subsystem) may be populated in the distributed ledgers maintained by the HCI node subsystem 210*a*-210*c*/300 in the HCI system 210. As such, changes to an operating system (e.g., an operating system patch), firmware, and/or software versions in an HCI node subsystem will be documented in the distributed ledger. In another example, if system database information is changed in an HCI node subsystem, a new HCI node subsystem hash value and a new HCI node subsystem sub-hash value (corresponding to the system database information in that HCI node subsystem) may be populated in the distributed ledgers maintained by the HCI node subsystem 210*a*-210*c*/300 in the HCI system 210. As such, changes associated with system information in an HCI node subsystem will be documented in the distributed ledger.

In another example, if log database information is changed in an HCI node subsystem, a new HCI node subsystem hash value and a new HCI node subsystem sub-hash value (corresponding to the log database information in that HCI node subsystem) may be populated in the distributed ledgers maintained by the HCI node subsystem 210a-210c/300 in the HCI system 210. As such, changes associated with log information such as alerts, events, or telemetry data added to a log in an HCI node subsystem will be documented in the distributed ledger. In another example, if inventory database information is changed in an HCI node subsystem, a new HCI node subsystem hash value and a new HCI node subsystem sub-hash value (corresponding to the inventory database information in that HCI node subsystem) may be populated in the distributed ledgers maintained by the HCI node subsystem 210a-210c/300 in the HCI system 210. As such, changes associated with a documented inventory in an HCI node subsystem will be documented in the distributed ledger.

In another example, if license database information is changed in an HCI node subsystem, a new HCI node subsystem hash value and a new HCI node subsystem sub-hash value (corresponding to the license database information in that HCI node subsystem) may be populated in the distributed ledgers maintained by the HCI node subsystem 210a-210c/300 in the HCI system 210. As such, changes associated with licenses utilized by an HCI node subsystem will be documented in the distributed ledger. In another example, if warranty database information is changed in an HCI node subsystem, a new HCI node subsystem hash value and a new HCI node subsystem sub-hash value (corresponding to the warranty database information in that HCI node subsystem) may be populated in the distributed ledgers maintained by the HCI node subsystem 210a-210c/300 in the HCI system 210. As such, changes associated with warranty information in an HCI node subsystem will be documented in the distributed ledger. In another example, if performance database information is changed in an HCI node subsystem, a new HCI node subsystem hash value and a new HCI node subsystem sub-hash value (corresponding to the performance database information in that HCI node subsystem) may be populated in the distributed ledgers maintained by the HCI node subsystem 210a-210c/300 in the HCI system 210. As such, changes associated with performance information (e.g., a documentation of operation below a performance threshold) in an HCI node subsystem will be documented in the distributed ledger.

The distributed ledger generated during the method 400 may be utilized in a variety of manners to perform HCI system management operations in order to manage the HCI system 210. In one embodiment, the HCI provider system 202 may utilize the distributed ledger in order to identify the cause of an issue in the HCI system 210. For example, with reference to FIG. 9 and in response to identifying an issue with the HCI system 210 (e.g., reported by a user of the HCI system 210, reported by an HCI node subsystem 210a-210c in the HCI system 210, etc.), the HCI provider system 202 may perform distributed ledger retrieval operations 900 that are illustrated as including the HCI provider system 202 retrieving the distributed ledger (and distributed ledger archives or other historical distributed ledger data) from the HCI node subsystem 210b via the networking subsystem 208 and the management subsystem 206 (e.g., via a management network), and the network 204. However, while the distributed ledger retrieval operations 900 are illustrated and described as being performed with the HCI node subsystem 210b, one of skill in the art in possession of the present disclosure will appreciate how the distributed ledger (and distributed ledger archives or other historical distributed ledger data) may be retrieved from the HCI node subsystems 210a or 210c while remaining within the scope of the present disclosure as well.

Following the retrieval of the distributed ledger (and distributed ledger archives or other historical distributed ledger data), the HCI provider system 202 may identify changes in HCI node subsystem hash values and/or HCI node subsystem sub hash values in order to identify the cause of the issue with the HCI system that was identified as discussed above. As such, with reference to the specific examples illustrated in FIGS. 7 and 8, following the identification of an issue with the HCI system 210, the HCI provider system 202 may identify changes with the HCI node subsystem hash value (from the HCI node subsystem hash value 506 to the HCI node subsystem hash value 800) and, in some embodiments, one or more of the HCI node subsystem sub hash values (from the HCI node subsystem sub hash value 506b to the HCI node subsystem sub hash value 802). Thus, the cause of the issue with the HCI system 210 may be identified as being the HCI node subsystem 210a (i.e., because a modification was performed on the HCI node subsystem 210a as indicated by the change of the HCI node subsystem hash value 506 to the HCI node subsystem hash value 800) and, in some embodiments, the cause of the issue with the HCI system 210 may be identified as being a particular component or configuration in the HCI node subsystem 210a (i.e., because a modification was performed on that component/configuration in the HCI node subsystem 210a as indicated by the change of the HCI node subsystem sub hash value 506b to the HCI node subsystem sub hash value 802). The HCI provider system 202 may then access the HCI node subsystem data in that HCI node subsystem 210a to further pinpoint the cause of the issue with the HCI system 210. For example, the HCI node subsystem hash value and/or HCI node subsystem sub hash value(s) may be utilized as a reference to critical log information and/or infrastructure changes that may be the cause of errors with the HCI system 210.

In another embodiment, the distributed ledger may be utilized by an HCI node subsystems in the HCI system 210 to determine whether to allow a configuration change to HCI node subsystem(s) in the HCI system 210. For example, in response to receiving a configuration change request, an HCI node subsystem in the HCI system 210 may broadcast details associated with the configuration change (e.g., a networking configuration) to the other HCI node subsystems in the HCI system 210, and each of the HCI node subsystems may operate to approve those configurations changes. In a specific example, the configuration change may be approved by any HCI node subsystem by comparing an HCI node subsystem hash value or HCI node subsystem sub hash value generated using that configuration change to an HCI node subsystem hash value or HCI node subsystem sub hash value stored in the distributed ledger for that HCI node subsystem, and approving the configuration change in response to a match, while denying the configuration change in the event there is no match.

In another embodiment, the distributed ledger may be utilized by an HCI node subsystems in the HCI system 210 to determine whether to allow an HCI node subsystem(s) to be added to the HCI system 210. For example, in response to being connected to the HCI system 210 (e.g., via the networking subsystem 208), a new HCI node subsystem may broadcast its HCI node subsystem hash value (and HCI node subsystem sub hash values in some embodiments) to the existing HCI node subsystems in the HCI system 210 (e.g., along with inventory and license information that may be utilized to validate the inventory and license for the new HCI node subsystem), and each of the existing HCI node subsystems may operate to approve the addition of the new HCI node subsystem to the HCI system 210. In a specific example, the HCI system add request may be approved by any existing HCI node subsystem by comparing the HCI node subsystem hash value or HCI node subsystem sub hash values generated by the new HCI node subsystem to an HCI node subsystem hash value or HCI node subsystem sub hash value stored in the distributed ledger for that existing HCI node subsystem (as well as validating the inventory and license information for the new HCI node subsystem), and approving the addition of the new HCI node subsystem to the HCI system 210 in response to a match, while denying the addition of the new HCI node subsystem to the HCI system 210 in the event there is no match. As such, HCI node subsystems may be prevented from being added to the HCI system 210 unless they are identical to the existing HCI node subsystems in that HCI system 210, and may be added/on-boarded to the HCI system 210 (as well as having networking configurations provided) when they are identical to the existing HCI node subsystems in that HCI system 210.

Thus, systems and methods have been described that provide for federated control of HCI infrastructure via the use of a distributed ledger maintained by each of the HCI node subsystems in an HCI system. For example, the HCI distributed ledger management system of the present disclosure may include a first HCI node in an HCI system that uses its first HCI node data to generate a first hash value that it stores in a distributed ledger and broadcasts to other HCI nodes in the HCI system. In response to a first modification performed on the first HCI node, the first HCI node uses its second HCI node data to generate a second hash value that it stores along with the first hash value in the distributed ledger, and broadcasts to the other HCI nodes in the HCI system. A management system may then determine that an issue exists in the HCI system and, in response, identify a cause of the issue based on the first hash value and the second hash value stored in the distributed ledger. The second hash value in the distributed ledger may also be used by the first HCI node to approve the configuration changes in other HCI nodes in the HCI system, approve the addition of other HCI nodes to the HCI system, and perform other HCI system management operations known in the art. As such, management of HCI systems is facilitated even in situations in which the HCI system provider does not have "direct" control of the HCI system/access to the location of the HCI system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Hyper-Converged Infrastructure (HCI) distributed ledger management system, comprising:
 a first Hyper-Converged Infrastructure (HCI) node subsystem that is included in an HCI system and that is configured to:
  generate, using first HCI node subsystem data for the first HCI node subsystem, a first HCI node subsystem hash value;
  store the first HCI node subsystem hash value in an HCI node subsystem distributed ledger maintained by the first HCI node subsystem; and
  broadcast the first HCI node subsystem hash value to at least one other HCI node subsystem that is included in the HCI system, and
 wherein the first HCI node subsystem is configured, in response to a first modification performed on the first HCI node subsystem, to:
  generate, using second HCI node subsystem data for the first HCI node subsystem, a second HCI node subsystem hash value;
  store the second HCI node subsystem hash value along with the first HCI node subsystem hash value in the HCI node subsystem distributed ledger maintained by the first HCI node subsystem; and
  broadcast the second HCI node subsystem hash value to the at least one other HCI node subsystem that is included in the HCI system; and
 at least one management system that is configured to:
  determine that an issue exists in the HCI system and, in response, identify a cause of the issue based on the first HCI node subsystem hash value and the second HCI node subsystem hash value stored in the HCI node subsystem distributed ledger.

2. The system of claim 1, wherein the first HCI node subsystem data for the first HCI node subsystem identifies at least one of: a first HCI node hardware component, a first HCI node software component, a first HCI node configuration, a first HCI node alert, and first HCI node performance information, and wherein the second HCI node subsystem data for the first HCI node subsystem identifies at least one of: a second HCI node hardware component, a second HCI node software component, a second HCI node configuration, a second HCI node alert, and second HCI node performance information.

3. The system of claim 1, wherein the first HCI node subsystem is configured to:
 receive a third HCI node subsystem hash value generated and broadcast by a second HCI node subsystem that is included in the HCI system; and
 store the third HCI node subsystem hash value in the HCI node subsystem distributed ledger maintained by the first HCI node subsystem, and
 wherein the first HCI node subsystem is configured, in response to a second modification performed on the second HCI node subsystem that is included in the HCI system, to:
  receive a fourth HCI node subsystem hash value generated and broadcast by the second HCI node subsystem; and
  store the fourth HCI node subsystem hash value along with the third HCI node subsystem hash value in the HCI node subsystem distributed ledger maintained by the first HCI node subsystem.

4. The system of claim 3, wherein the at least one management system that is configured to:
 determine that the issue exists in the HCI system and, in response, identify the cause of the issue based on at least one of:
  the first HCI node subsystem hash value and the second HCI node subsystem hash value stored in the HCI node subsystem distributed ledger; and
  the third HCI node subsystem hash value and the fourth HCI node subsystem hash value stored in the HCI node subsystem distributed ledger.

5. The system of claim 3, wherein the third HCI node subsystem data for the second HCI node subsystem identifies at least one of: a third HCI node hardware component, a third HCI node software component, a third HCI node configuration, a third HCI node alert, and third HCI node performance information, and wherein the fourth HCI node subsystem data for the second HCI node subsystem identifies at least one of: a fourth HCI node hardware component, a fourth HCI node software component, a fourth HCI node configuration, a fourth HCI node alert, and fourth HCI node performance information.

6. The system of claim 1, wherein the first HCI node subsystem is configured to:
receive, from a second HCI node subsystem, a request to be added to the HCI system along with a third HCI node subsystem hash value generated by the second HCI node subsystem;
compare the third HCI node subsystem hash value to the second HCI node subsystem hash value; and
transmit, in response to the third HCI node subsystem hash value matching the second HCI node subsystem hash value, an approval for the second HCI node subsystem to be added to the HCI system.

7. An Information Handling System (IHS), comprising:
a processing system; and
a memory system that is coupled to the processing system and that includes instructions that, when executed by the processing system, cause the processing system to provide an HCI system management engine that is configured to:
generate, using first IHS data for the IHS that is included in an HCI system, a first IHS hash value;
store the first IHS hash value in a distributed ledger maintained by the HCI system management engine; and
broadcast the first IHS hash value to at least one HCI node subsystem that is included in the HCI system, and
wherein the HCI system management engine is configured, in response to a first modification performed on the IHS, to:
generate, using second IHS data for the IHS, a second IHS hash value;
store the second IHS hash value along with the first IHS hash value in the distributed ledger maintained by the HCI system management engine, wherein the first IHS hash value and the second IHS hash value stored in the distributed ledger are configured to identify a cause of an issue with the HCI system; and
broadcast the second IHS hash value to the at least one other HCI node subsystem that is included in the HCI system.

8. The IHS of claim 7, wherein the first IHS data for the IHS identifies at least one of: a first IHS hardware component, a first IHS software component, a first IHS configuration, a first IHS alert, and first IHS performance information, and wherein the second IHS data for the IHS identifies at least one of: a second IHS hardware component, a second IHS software component, a second IHS configuration, a second IHS alert, and second IHS performance information.

9. The IHS of claim 7, wherein the HCI system management engine is configured to:
receive a first HCI node subsystem hash value generated and broadcast by a first HCI node subsystem that is included in the HCI system; and
store the first HCI node subsystem hash value in the distributed ledger maintained by the HCI system management engine, and wherein the HCI system management engine is configured, in response to a second modification performed on the first HCI node subsystem that is included in the HCI system, to:
receive a second HCI node subsystem hash value generated and broadcast by the first HCI node subsystem; and
store the second HCI node subsystem hash value along with the first HCI node subsystem hash value in the distributed ledger maintained by the HCI system management engine.

10. The IHS of claim 9, wherein at least one of: 1) the first IHS hash value and the second IHS hash value stored in the distributed ledger; and 2) the first HCI node subsystem hash value and the second HCI node subsystem hash value stored in the distributed ledger, are configured to identify the cause of the issue with the HCI system.

11. The IHS of claim 9, wherein the first HCI node subsystem data for the first HCI node subsystem identifies at least one of: a first HCI node hardware component, a first HCI node software component, a first HCI node configuration, a first HCI node alert, and first HCI node performance information, and wherein the second HCI node subsystem data for the first HCI node subsystem identifies at least one of: a second HCI node hardware component, a second HCI node software component, a second HCI node configuration, a second HCI node alert, and second HCI node performance information.

12. The IHS of claim 7, wherein the HCI system management engine is configured to:
receive, from a first HCI node subsystem, a request to be added to the HCI system along with a first HCI node subsystem hash value generated by the first HCI node subsystem;
compare the first HCI node subsystem hash value to the second IHS hash value; and
transmit, in response to the first HCI node subsystem hash value matching the second IHS hash value, an approval for the first HCI node subsystem to be added to the HCI system.

13. The IHS of claim 7, wherein the HCI system management engine is configured to:
receive, from a first HCI node subsystem, a request to perform a configuration change along with a first HCI node subsystem hash value generated by the first HCI node subsystem;
compare the first HCI node subsystem hash value to the second IHS hash value; and
transmit, in response to the first HCI node subsystem hash value matching the second IHS hash value, an approval for the first HCI node subsystem to perform the configuration change.

14. A method for managing a Hyper-Converged Infrastructure (HCI) system via a distributed ledger, comprising:
generating, by a first HCI node subsystem included in an HCI system using first HCI node subsystem data for the first HCI node subsystem, a first HCI node subsystem hash value;
storing, by the first HCI node subsystem, the first HCI node subsystem hash value in an HCI node subsystem distributed ledger maintained by the first HCI node subsystem;
broadcasting, by the first HCI node subsystem, the first HCI node subsystem hash value to at least one other HCI node subsystem that is included in the HCI system, and generating, by the first HCI node subsystem in response to a first modification performed on the first HCI node subsystem and using second HCI node subsystem data for the first HCI node subsystem, a second HCI node subsystem hash value;

storing, by the first HCI node subsystem, the second HCI node subsystem hash value along with the first HCI node subsystem hash value in the HCI node subsystem distributed ledger maintained by the first HCI node subsystem, wherein the first HCI node subsystem hash value and the second HCI node subsystem hash value stored in the HCI node subsystem distributed ledger are configured to identify a cause of an issue with the HCI system; and broadcasting, by the first HCI node subsystem, the second HCI node subsystem hash value to the at least one other HCI node subsystem that is included in the HCI system.

15. The method of claim 14, wherein the first HCI node subsystem data for the first HCI node subsystem identifies at least one of: a first HCI node hardware component, a first HCI node software component, a first HCI node configuration, a first HCI node alert, and first HCI node performance information, and wherein the second HCI node subsystem data for the first HCI node subsystem identifies at least one of: a second HCI node hardware component, a second HCI node software component, a second HCI node configuration, a second HCI node alert, and second HCI node performance information.

16. The method of claim 14, further comprising:
receiving, by the first HCI node subsystem, a third HCI node subsystem hash value generated and broadcast by a second HCI node subsystem that is included in the HCI system;

storing, by the first HCI node subsystem, the third HCI node subsystem hash value in the HCI node subsystem distributed ledger maintained by the first HCI node subsystem;

receiving, by the first HCI node subsystem in response to a second modification performed on the second HCI node subsystem, a fourth HCI node subsystem hash value generated and broadcast by the second HCI node subsystem; and storing, by the first HCI node subsystem, the fourth HCI node subsystem hash value along with the third HCI node subsystem hash value in the HCI node subsystem distributed ledger maintained by the first HCI node subsystem.

17. The method of claim 16, wherein at least one of: 1) the first HCI node subsystem hash value and the second HCI node subsystem hash value stored in the HCI node subsystem distributed ledger; and 2) the third HCI node subsystem hash value and the fourth HCI node subsystem hash value stored in the HCI node subsystem distributed ledger, are configured to identify the cause of the issue with the HCI system.

18. The method of claim 16, wherein the third HCI node subsystem data for the second HCI node subsystem identifies at least one of: a third HCI node hardware component, a third HCI node software component, a third HCI node configuration, a third HCI node alert, and third HCI node performance information, and wherein the fourth HCI node subsystem data for the second HCI node subsystem identifies at least one of: a fourth HCI node hardware component, a fourth HCI node software component, a fourth HCI node configuration, a fourth HCI node alert, and fourth HCI node performance information.

19. The method of claim 14, further comprising:
receiving, by the first HCI node subsystem from a second HCI node subsystem, a request to be added to the HCI system along with a third HCI node subsystem hash value generated by the second HCI node subsystem;

comparing, by the first HCI node subsystem, the third HCI node subsystem hash value to the second HCI node subsystem hash value; and transmitting, in response to the third HCI node subsystem hash value matching the second HCI node subsystem hash value, an approval for the second HCI node subsystem to be added to the HCI system.

20. The method of claim 14, further comprising:
receiving, by the first HCI node subsystem from a second HCI node subsystem, a request to perform a configuration change along with a third HCI node subsystem hash value generated by the second HCI node subsystem;

comparing, by the first HCI node subsystem, the third HCI node subsystem hash value to the second HCI node subsystem hash value; and transmitting, in response to the third HCI node subsystem hash value matching the second HCI node subsystem hash value, an approval for the second HCI node subsystem to perform the configuration change.

* * * * *

UNITED STATES PATENT AND TRADEMARK OFFICE
CERTIFICATE OF CORRECTION

| | |
|---|---|
| PATENT NO. | : 11,431,564 B1 |
| APPLICATION NO. | : 17/458361 |
| DATED | : August 30, 2022 |
| INVENTOR(S) | : Babu et al. |

It is certified that error appears in the above-identified patent and that said Letters Patent is hereby corrected as shown below:

On the Title Page

Item (56), References Cited, U.S. Patent Documents, "1,210,150 A * 12/1916 Clark" should be changed to --7,284,041 B2 10/2007 Nakatani et al.--

Signed and Sealed this
First Day of November, 2022

Katherine Kelly Vidal
*Director of the United States Patent and Trademark Office*